(12) United States Patent
Zhang

(10) Patent No.: US 8,831,089 B1
(45) Date of Patent: Sep. 9, 2014

(54) METHOD AND APPARATUS FOR SELECTING OPTIMAL VIDEO ENCODING PARAMETER CONFIGURATIONS

(75) Inventor: Huipin Zhang, Santa Clara, CA (US)

(73) Assignee: Geo Semiconductor Inc., Santa Clara, CA (US)

( * ) Notice: Subject to any disclaimer, the term of this patent is extended or adjusted under 35 U.S.C. 154(b) by 1579 days.

(21) Appl. No.: 11/496,410

(22) Filed: Jul. 31, 2006

(51) Int. Cl.
*H04N 11/02* (2006.01)

(52) U.S. Cl.
USPC .................................................. 375/240.01

(58) Field of Classification Search
None
See application file for complete search history.

(56) References Cited

U.S. PATENT DOCUMENTS

| | | | |
|---|---|---|---|
| 5,231,484 A * | 7/1993 | Gonzales et al. | 375/240.04 |
| 5,446,492 A | 8/1995 | Wolf et al. | 348/192 |
| 5,596,364 A | 1/1997 | Wolf et al. | 348/192 |
| 5,694,484 A * | 12/1997 | Cottrell et al. | 382/167 |
| 5,964,484 A * | 10/1999 | Bartholomew | 285/319 |
| 6,031,939 A * | 2/2000 | Gilbert et al. | 382/239 |
| 6,075,884 A * | 6/2000 | Lubin et al. | 382/156 |
| 6,496,221 B1 | 12/2002 | Wolf et al. | 348/192 |
| 6,859,496 B1 * | 2/2005 | Boroczky et al. | 375/240.26 |
| 7,092,448 B2 * | 8/2006 | Turaga et al. | 375/240.26 |
| 2004/0045030 A1 * | 3/2004 | Reynolds et al. | 725/110 |
| 2007/0071404 A1 * | 3/2007 | Curtner et al. | 386/95 |
| 2007/0268836 A1 * | 11/2007 | Byun et al. | 370/252 |

OTHER PUBLICATIONS

W.H. Press, B.P. Flannery, S.A. Teukolsky, W.T. Vetterling, Numerical Recipes in C, Cambridge University Press, 1988, pp. 397-412, http://www.library.cornell.edu/nr/bookcpdr/c10-1.pdf, http://www.library.cornell.edu/nr/bookcpdr/c10-4.pdf.

A.B. Watson, "Visual Optimization of DCT Quantization Matrices For Individual Images", Proceedings, AIAA Computing in Aerospace 9, San Diego, CA, American Institute of Aeronautics and Astonautics, pp. 286-291, 1993, pp. 1-6, http://vision.arc.nasa.gov/publications/aaia93abw.pdf.

* cited by examiner

*Primary Examiner* — Mehrdad Dastouri
*Assistant Examiner* — James Anderson, II
(74) *Attorney, Agent, or Firm* — Sughrue Mion, PLLC

(57) ABSTRACT

A method for determining optimal video encoding parameters is disclosed. The method generally includes the steps of (A) storing a plurality of configurable parameters each comprising a respective trial value, (B) generating a bitstream by encoding a test sequence of pictures using (i) a plurality of non-configurable parameters fixed in a design of the encoder, (ii) the configurable parameters and (iii) a plurality of dynamic parameters adjustable in real time by the encoder, (C) generating a reconstructed sequence of pictures by decoding the bitstream, (D) generating a quality metric based on the reconstructed sequence of pictures compared with the test sequence of pictures and (E) adjusting the respective trial values to optimize the quality metric.

19 Claims, 4 Drawing Sheets

METHOD AND APPARATUS FOR SELECTING OPTIMAL VIDEO ENCODING PARAMETER CONFIGURATIONS

FIELD OF THE INVENTION

The present invention relates to video processing generally and, more particularly, to a method and/or apparatus for selecting optimal video encoding parameter configurations.

BACKGROUND OF THE INVENTION

State of the art video codecs, such as the joint video specification from the International Organization for Standardization (ISO)/International Electrotechnical Commission (IEC) ISO/IEC 14496-10 AVC and the International Telecommunication Union-Telecommunication Standardization Sector (ITU-T) H.264 (commonly referred to as H.264/AVC), Society of Motion Picture and Television Engineers (SMPTE) VC-1, Moving Pictures Expert Group (MPEG) MPEG-4 Visual and ITU-T H.263, have reached high levels of sophistication. The codecs are complicated and have many control parameters for encoding. For example, in the H.264/AVC reference software Joint Model (JM) version 10.2, approximately 180 control parameters exist for encoding. A commercial implementation of an H.264/AVC encoder commonly has even more parameters to achieve fine control.

The encoding parameters are conventionally configured intuitively or empirically based on limited experiments. For example, in order to alleviate video quality fluctuations from frame to frame, a threshold for quantization parameter differences between consecutive frames is set to a small value. Setting parameter values through intuitive or empirical experiments, though simple, cannot guarantee optimal video encoding quality. In addition, the parameters are usually configured independently. As such, although the parameters are optimal individually, the overall setting of multiple parameters may not be optimal. It would be desirable to implement a systematic framework for configuring the parameters.

SUMMARY OF THE INVENTION

The present invention concerns a method for determining optimal video encoding parameters. The method generally comprises the steps of (A) storing a plurality of configurable parameters each comprising a respective trial value, (B) generating a bitstream by encoding a test sequence of pictures using (i) a plurality of non-configurable parameters fixed in a design of the encoder, (ii) the configurable parameters and (iii) a plurality of dynamic parameters adjustable in real time by the encoder, (C) generating a reconstructed sequence of pictures by decoding the bitstream, (D) generating a quality metric based on the reconstructed sequence of pictures compared with the test sequence of pictures and (E) adjusting the respective trial values to optimize the quality metric.

The objects, features and advantages of the present invention include providing a method and/or apparatus for selecting optimal video encoding parameter configurations that may (i) automatically optimize firmware-based encoding parameters, (ii) improve video quality compared with conventional approaches and/or (iii) provide a systematic framework of configuring encoding parameters.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
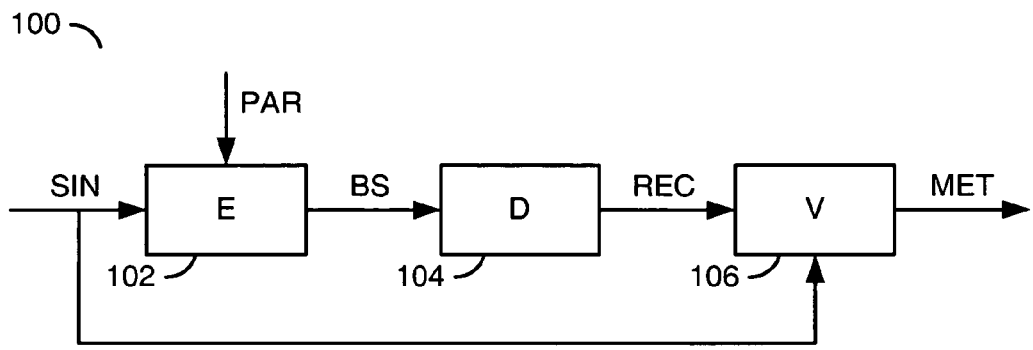
FIG. 1 is a functional block diagram of an example system for a video encoding performance assessment in accordance with a preferred embodiment of the present invention.

Encoding control parameters in the H.264/AVC, MPEG-4, VC-1, H.263 and similar video coding standards may be classified into three groups. A first group generally contains non-configurable parameters that may be determined according to system criteria. Examples of system parameters may include, but are not limited to, a Group Of Pictures (GOP) structure, a level and profile, an entropy coding mode (e.g., Variable Length Coding (VLC) or arithmetic coding), a total number of reference frames, a picture resolution, a frame rate and an interlace coding support. The system parameters may be determined at the system level with considerations of a target application, memory constraints, computational complexity constraints and the like. The system parameters may affect video encoding quality, but are generally not configurable once established by a system specification.

A second group of parameters generally includes dynamic parameters optimized inside an encoder. Some examples of such parameters include, but are not limited to, a motion vector range, an intra/inter encoding mode decision, an intra prediction mode, a reference frame selection, Motion Vectors (MV), and a Macroblock Adaptive Frame/Field (MBAFF)/ Picture Adaptive Frame/Field (PAFF) decision. The second group parameters are usually derived with respect to an optimization criterion. For example, a motion vector for a Macroblock (MB) may be obtained via a full search to minimize a Sum of Absolute Difference (SAD), a Sum of Squared Difference (SSD), or a Lagrangian rate-distortion cost with a specified Lagrangian multiplier. The dynamic parameters may be selected by the encoder in real time for optimal video encoding quality, but are rarely pre-configured outside the encoder.

The third group of parameters generally includes configurable parameters that may be specified outside the encoder to control the encoding quality. In a software/hardware partitioned encoder system, the configurable parameters are usually set in firmware that is loadable into the encoder. Some examples of firmware parameters include, but are not limited to, macroblock level quantization parameters, adaptive quantization parameters, quantization scaling matrices, quantization rounding offsets, Lagrangian multipliers for optimal coding parameter selection, Lagrangian multipliers for motion vector searches, Lagrangian multipliers for coding mode selection, rate control parameters and various thresholds, such as the thresholds used to control validity of a SKIP/ COPY mode control parameter. The configurable parameters are generally set outside the encoder and may potentially have the most number of control options in the encoder. Therefore, correctly setting the firmware parameters may be useful for the optimal encoding quality.

The present invention generally introduces a systematic framework of configuring the configurable firmware parameters for optimal video encoding. Finding an optimal setting of the encoding parameters may be considered as an optimization problem of maximizing an expected video encoding quality under a set of constraints that may include a video quality measure, a target bitrate, a computation criteria, a memory bandwidth and the like. The optimization problem may be solved through numerical search methods with encoding of various sequences with different encoding parameter settings.

An expected video encoding performance is generally measured in terms of a video quality assessment metric that measures a degradation of a reconstructed sequence of pictures relative to a reference test sequence of pictures. Existing video quality assessment techniques may be available from the Video Quality Experts Group (VQEG). The VQEG is a group of experts in the field of video quality assessment working with several internationally recognized organizations, such as ITU. An example of a video quality assessment metric is a Peak Signal-to-Noise Ratio (PSNR) metric. The PSNR metric is widely used in the area of image/video processing. Another example metric is a Video Quality Metric (VQM). The VQM is a measurement paradigm of video quality based on methods for objective measurement of video quality. Developed by the National Telecommunication and Information Administration, Institute for Telecommunications Sciences (NTIA/ITS), VQM generally implements objective measurement methods that may provide close approximations to overall quality impressions of digital video impairments that have been graded by panels of viewers.

Referring to FIG. 1, a functional block diagram of an example system 100 for a video encoding performance assessment in accordance with a preferred embodiment of the present invention is shown. The system (or process) 100 may be referred to as a video processing system. The video processing system 100 generally comprises a module (or step) 102, a module (or step) 104 and a module (or step) 106. A signal (e.g., SIN) may be received by the module 102. A signal (e.g., PAR) may be received by the module 102. The module 102 may generate and present a signal (e.g., BS) to the module 104. A signal (e.g., REC) may be generated and presented from the module 104 to the module 106. The module 106 may receive the signal SIN. A signal (e.g., MET) may be generated and presented from the module 106.

The module 102 may be referred to as an encoder module. The encoder module 102 may be operational (e.g., function E) to generate the bitstream signal BS based on (i) a test sequence of pictures (e.g., S) received in the signal SIN and (ii) multiple parameter values (e.g., P) received in the signal PAR (e.g., BS=E(S, P)). The resulting bitstream signal BS may be compliant with the H.264/AVC, MPEG-4, VC-1, H.263 or other video codec standards.

The module 104 may be referred to as a decoder module. The decoder module 104 may be operational (e.g., function D) to generate a reconstructed sequence of pictures (e.g., S') in the signal REC from the encoded information received in the bitstream signal BS (e.g., S'=D(BS)). Where the codec standard is a lossy standard, the reconstructed pictures S' in the signal REC are generally different from the original pictures S in the signal SIN.

The module 106 may be referred to as an assessment module. The assessment module 106 may be operational (e.g., function V) to generate one or more video quality metrics (e.g., M(P)) in the signal MET. The video quality metrics may be based on (i) the parameter set P and (ii) the original test sequence of pictures S in the signal SIN compared with the reconstructed sequence of pictures S' in the signal REC (e.g., M(P)=V(S, S')).

Figure 2:
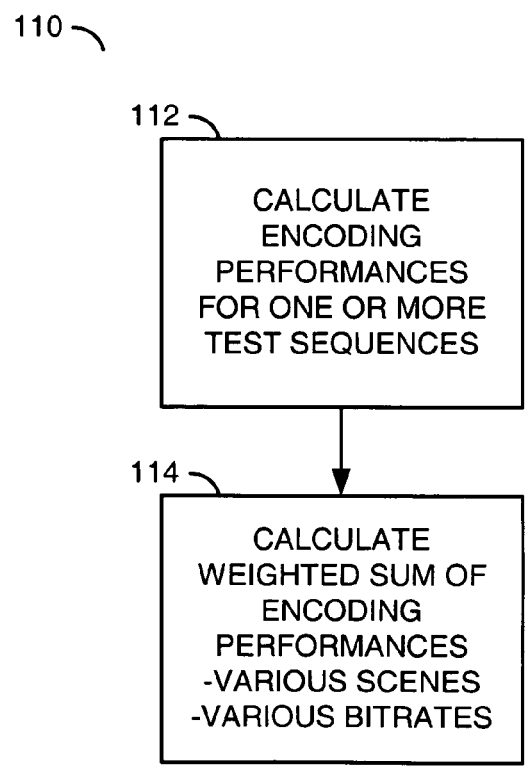
FIG. 2 is a flow diagram of an example method for calculating an encoder performance.

Referring to FIG. 2, a flow diagram of an example method 110 for calculating an encoder performance is shown. The method (or process) 110 generally comprises a step (or module) 112 and a step (or module) 114. A mathematical representation of the video quality metrics M(P) as a function of the parameter set P and the test sequence S may be defined by equation 1 as follows:

$$M(P)=V(S,S')=V(S,D(BS))=V(S,D(E(S,P))) \qquad \text{Eq. (1)}$$

The quality values M(P) in equation 1 generally measures the encoding performance of encoder module 102 for a single sequence of pictures S received in the signal SIN. The expected encoding performance of the encoder module 102 may be calculated in the step 112 for one or more test sequences.

An expected encoding performance of the encoder module 102 (e.g., $\Psi(M(P))$) may be defined as a weighted sum of encoding performances for a set of video sequences (e.g., {Si}) of various video signal characteristics (e.g., bitrates, scenes). The expected encoding performance may be expressed per equation 2 as follows:

$$\Psi(M(P)) = \sum_i \alpha_i M_i(P) \qquad \text{Eq. (2)}$$

where (i) $\alpha_i$ may be a weighting factor and (ii) $M_i(P)$ may be the video encoding performance of the encoder module 102 corresponding to the "i"th video sequence $S_i$. The weighted sum of encoding performances may be calculated in the step 114. A set of optimal parameter configuration values (e.g., Po) may be defined as a solution to the optimization problem of maximizing the expected encoding performance per equation 3 as follows:

$$Po = \arg\max_P \Psi(M(P)) \qquad \text{Eq. (3)}$$

where the mathematical function "argmax" may return the value of P that results in the maximum value of $\Psi(M(P))$.

Since the parameters P may be configured for a specified bitrate or a specified bitrate range, the optimization problem may be constrained with the bitrate/bitrates of the resulting bitstreams. If the constraint is for a specified bitrate, a rate control capability inside the encoder module 102 may be enabled to ensure that the encoder module 102 generates the bitstream BS of the specified bitrate. If the constraint is for a specified bitrate range, M(P) in equation 3 may be replaced with a video encoding performance metric characterizing the whole bitrate range. Such a metric may be a weighted sum of the encoding performance corresponding to several selected bitrates in the bitrate range. The encoding performance corresponding to a selected bitrate may be a measured value M(P) as in equation 1 or an interpolated value based on the measured values M(P) corresponding to the bitrates around the selected bitrate.

Dimensions of the parameters P in equation 3 may be reduced to make the optimization problem tractable in practice. A way of reducing the dimensions may be to divide the parameter set into subsets so that parameters (i) are strongly correlated within a subset and (ii) are relatively uncorrelated between subsets. As such, the equation 3 may be performed separately on each subset. For example, configuring the quantization scaling matrices may be separate from configuring the Lagrangian multipliers for a motion vector search. Since the dimension of each of the parameter subsets is reduced, the optimization problem of equation 3 is more practically tractable.

An objective function of the optimization problem for equation 3 relies on the set of video sequences $\{Si\}$ for the expected encoding performance $\Psi(M(P))$. The selection of the test sequences $Si$ is generally subjective and may be application dependent. The sequences $Si$ should be representative for various video signal characteristics for a specific application. The weighting factors $\alpha i$ in equation 2 may reflect the universality of video characteristics in sequence $Si$ in the application. The more common the signal features in a sequence $Si$ are in the application, the larger the corresponding weighting factors $\alpha i$. In some embodiments, an objective may be to assign an equal weight to every selected sequence $Si$.

The optimization problem of equation 3 may be solved with a trial-based discrete search process (or method) that evaluates individual trials and compares the trial results. Each trial generally corresponds to a specific set of parameters. The discrete parameters may be generated from continuous parameters. Dependent on the parameter ranges and discrete resolution, the overall search space for the optimal parameters Po may contain a significant number of parameter sets P. In general, a full search technique is computationally expensive. Fast search techniques may be more practical.

An example of a fast search technique is commonly referred to as a Golden Section Search (GSS). The GSS generally finds an optimal value for each parameter individually and sequentially. The GSS method may employ a direct function evaluation to locate a minimum of a one-dimensional function $F(X)$ in a bracket $(A, B)$, where there exists an intermediate point C such that $A<C<B$, $F(A)>F(C)$ and $F(C)<F(B)$. The GSS method generally involves evaluating the function F at some point X in the larger of the two subintervals $(A, C)$ or $(C, B)$. If $F(X)<F(C)$ then D replaces the intermediate point C, and the point C becomes an end point. If $F(X)>F(C)$ then C remains the midpoint with X replacing the appropriate subinterval end point A or B. Either way, the width of the bracketing interval reduces and the position of a minimal point (e.g., optimal point) is better defined. The procedure may be repeated until a remaining bracketed width achieves a desired tolerance.

Figure 3:
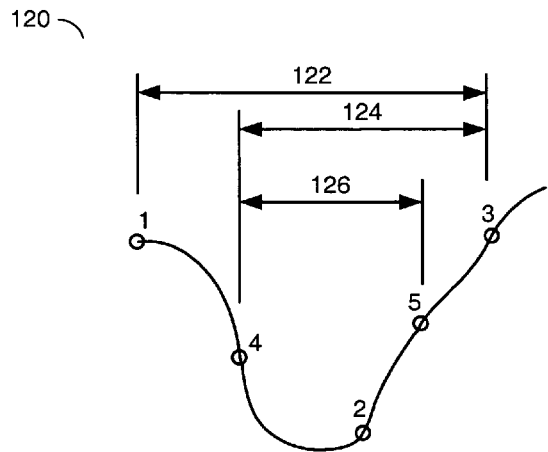
FIG. 3 is a diagram of an example curve illustrating a Golden Section Search operation.

Referring to FIG. 3, a diagram of an example curve 120 illustrating a Golden Section Search operation is shown. In particular, the curve 120 may be used to illustrate the GSS search process. An initial bracket 122 may be defined by an original end point 1 (e.g., A) and an original end point 3 (e.g., B) along the curve 120. A point 2 (e.g., C) may define a horizontal intermediate point between the end points 1 and 3. The intermediate point 2 may be calculated based on a test process estimating a minimal value along the curve 120.

If a horizontal subinterval (1, 2) is larger than a horizontal subinterval (2, 3), a new point 4 (e.g., X) may be calculated as a proportion (e.g., $(3-\sqrt{5})/2$ Golden Section) of the larger subinterval (1, 2), as measured from the intermediate point 2. Since the value of F(4) is greater than the value of F(2), the new point 4 replaces the original end point 1. A new bracket 124 may be defined between the new end point 4 (e.g., new A) and the original end point 3 (e.g., B) with the point 2 remaining as the intermediate point (e.g., C). If the subinterval (3, 2) is larger than the subinterval (4, 2), a new point 5 (e.g., new X) may be calculated from the intermediate point 2 along the larger subinterval (3, 2). Since the value of F(5) is greater than the value of F(2), the new point 5 replaces the original end point 3.

The above steps may be repeated. A new bracket 126 may be defined between the end point 4 (e.g., A) and the end point 5 (e.g., new B) with the point 2 remaining as the intermediate point (e.g., C). The subintervals (4, 2) and (5, 2) may be evaluated for the longest subinterval. Another intermediate point X may be calculated, a shorter bracket may be defined, and so on. The iterations may continue until a predefined condition is reached. The predefined condition may be (i) a fixed number of iterations, (ii) a bracket width below a bracket threshold and/or (iii) a longest subinterval below an interval threshold. Other conditions may be used to meet the criteria of a particular application.

Another example of a fast search technique is commonly referred to as a Downhill Simplex Search (DSS), also called a Nelder-Mead Search. The DSS technique is generally a multidimensional search method (or process) involving direct function evaluation. The DSS technique may operate on a solution space, referred to as a simplex. A simplex may be defined as a geometrical figure in N dimensions comprising N+1 vertices. For example, a simplex may be a triangle in 2-dimensional space and a tetrahedron in 3-dimensional space. The DSS technique generally takes a set of N+1 points that form the N-dimensional simplex and makes a serial of moves to reach a minimum region.

Figures 4A, 4B, 4C, 4D, 4E:
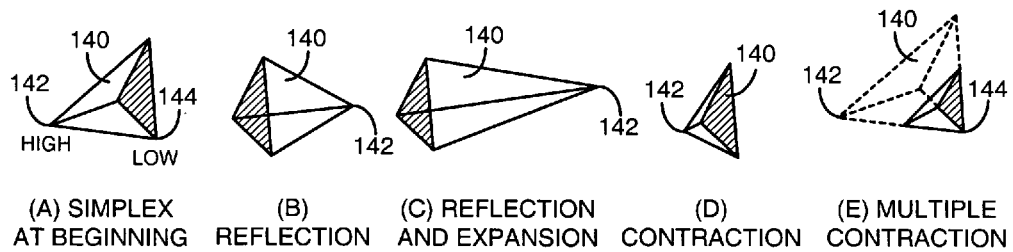
FIGS. 4A-4E are a sequence of example 3-dimensional simplex of a function in a Downhill Simplex Search operation.

Referring to FIGS. 4A-4E, a sequence of example 3-dimensional simplex of a function in a Downhill Simplex Search operation are shown. FIG. 4A is a diagram of an example initial simplex 140 having a high vertex 142 and a low vertex 144. The high vertex 142 may achieve a highest value of the function. The low vertex 144 generally achieves a lowest value of the function. The low vertex 144 may be found through one or more operations on the initial simplex 140, as shown in FIGS. 4B-4E.

FIG. 4B is a diagram of an example reflection of the simplex 140 away from the high point 142. FIG. 4C is a diagram of an example reflection and expansion of the simplex 140 away from the high point 142. FIG. 4D is a diagram of an example contraction of the simplex 140 along a single dimension from the high point 142. FIG. 4E is a diagram of an example contraction of the simplex 140 along all dimensions toward the low point 144. An appropriate sequence of such steps may converge to a minimum of the function.

Figure 5:
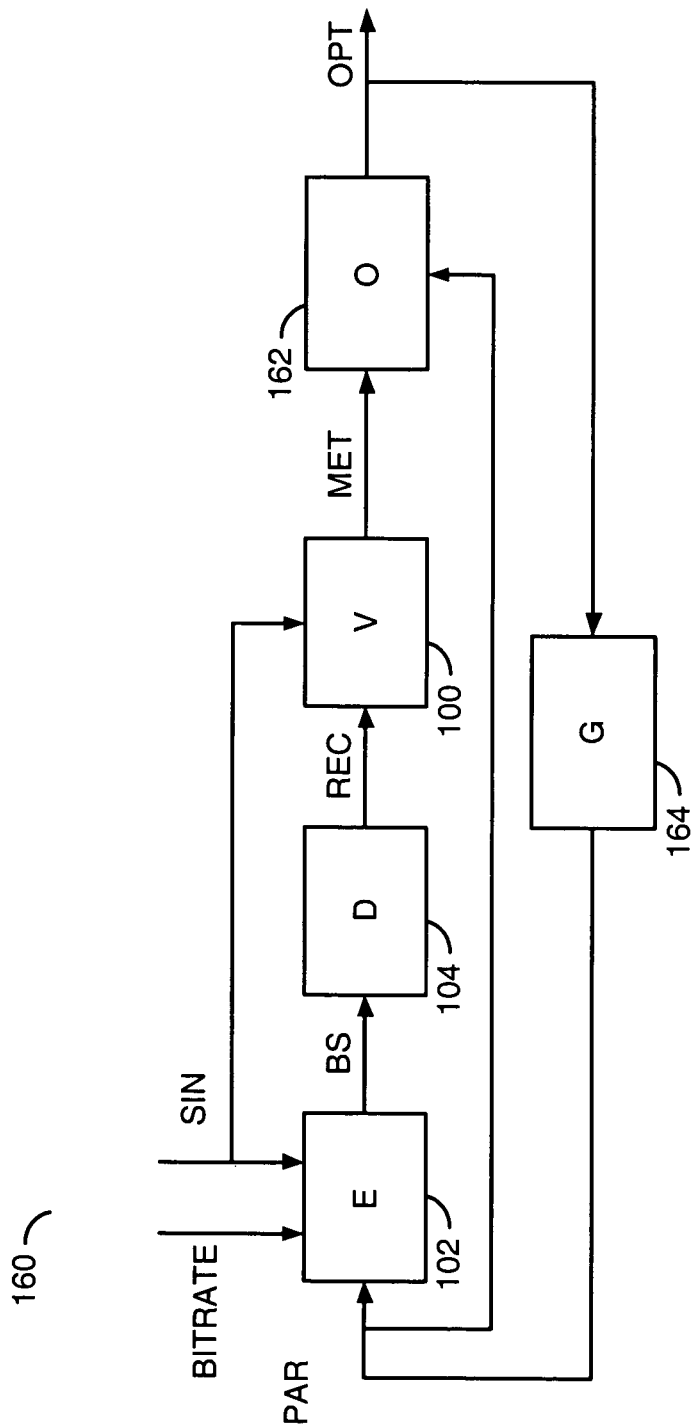
FIG. 5 is a functional block diagram of an example system for selecting optimal video encoding parameter configurations.

Referring to FIG. 5, a functional block diagram of an example system 160 for selecting optimal video encoding parameter configurations is shown. The system 160 may also be referred to as a video processing system. The video processing system 160 generally comprises the encoder module 102, the decoder module 104, the assessment module 106, a module (or step) 162 and a module (or step) 164. The module 162 may receive the signal MET and the signal PAR. A signal (e.g., OPT) may be generated and presented from the module 162 to the module 164. The module 164 may generate the signal PAR.

The module 162 may be referred to as a parameter optimizer module. The parameter optimizer module 162 may be operational to control the overall optimization process for the parameters P. A solution for the optimization problem may be calculated through a trial-based one-dimensional or a multi-dimensional numerical search method. During a search, the parameter optimizer module 162 may compare a resulting video quality value M in the signal MET with a current best quality value stored internally. If a higher encoding quality is achieved, the best quality value M is updated and the current parameter set P in the signal PAR may be identified as the new optimal parameter set Po. The optimal parameter set Po may be conveyed in the signal OPT.

The parameter optimizer module 162 may also be operational to determine when the optimization process terminates. Termination may be base on (i) completing a finite number of iterations for the trial parameters P, (ii) achieving a quality metric above a threshold and/or (iii) reaching a limited stability for the trial parameters P. Other completion conditions may be implemented to meet the criteria of a particular application.

The module 164 may be referred to as a parameter generator module. The parameter generator module 164 may be operational to generate one or more trial parameter sets P for one or more trials in the optimization process based on the current optimal parameter set Po in the signal OPT. The parameter generation may implement a trial-based search method, such as the GSS method, the DSS method or other search methods to create each new trial parameter set P.

The video processing systems 100 and 160 generally formulate the problem of parameter configuration in video encoding as an optimization problem. A framework is presented herein for video encoding. However, the video processing systems 100 and/or 160 may be applicable to image encoding or any parameter setting problem as well. The framework of the video processing systems 100 and/or 160 may be specifically formulated for optimally configuring the firmware-based configurable parameters that control the video encoding quality, where the configuration may be performed outside the encoder based on one or more test sequences of pictures. As such, the video processing systems 100 and 160 may be implemented in software executing on a computer in some embodiments. In other embodiments, parts of the video processing systems 100 and 160 may be implemented in a combination of hardware and software. For example, the encoder module 102 and the decoder module 104 may be implemented in hardware. The assessment module 106, the optimizer module 162 and the parameter generator module 164 may be implemented in software. Appropriate input/output circuitry may be used for communication between the hardware modules and software modules.

Figure 6:
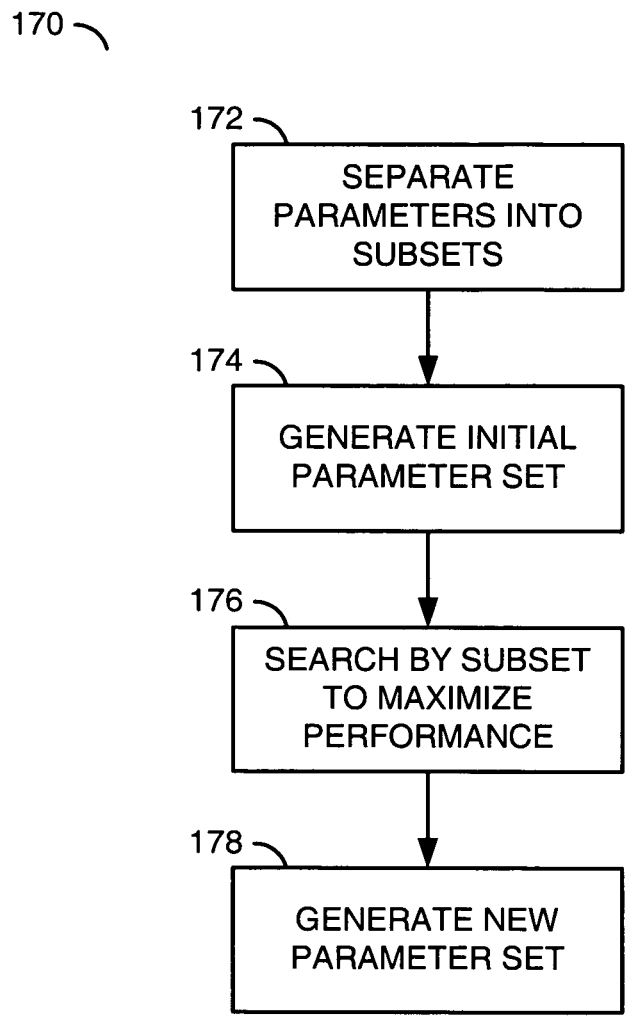
FIG. 6 is a flow diagram of an example method for generating parameter sets.

Referring to FIG. 6, a flow diagram of an example method 170 for generating parameter sets is shown. The method (or process) 170 generally comprises a step (or module) 172, a step (or module) 174, a step (or module) 176 and a step (or module) 178. In the step 172, the parameter generator module 164 may separate the parameters into subsets. The parameters may be strongly correlated within each subset and relatively uncorrelated between the subsets. In the step 174, the parameter generator module 164 may create an initial set of parameters of each subset as a starting point to the optimization process. A search is generally performed in the step 176 for each parameter in each subset seeking a maximum performance of the encoder module 102. After the search has completed, the parameter generator module 164 may present the trial parameter set to the encoder module 102 in the step 178. Generally, the optimization may be performed separately for each subset. For example, the processing of FIG. 5 may be applied for each subset.

With the same spirit, a similar framework may be formulated for optimizing the encoding parameters from inside an encoder. For example, a motion estimation search for an optimal motion vector of a macroblock may be solved by the present invention, instead of via a full search technique. A conventional full search evaluates every candidate in a search window to find a best candidate for a search block. In contrast, the video processing system 160 may be part of an encoder system using the DSS search method. The DSS method may heuristically select some of the candidate motion vectors (but not all of the candidate motion vectors) inside the search window for evaluation. The evaluations may use the same search metric as the full search (e.g., Sum of Squared Differences or Sum of Absolute Differences). A difference between the conventional full search approach and the present invention may be that the DSS is a faster search method.

The functions performed by the functional block diagrams of FIGS. 1 and 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for determining video encoding parameters that are used by an encoder, comprising the steps of:
   (A) storing a plurality of configurable parameters each comprising a respective trial value;
   (B) generating a bitstream by encoding a test sequence of pictures that are not embedded in a video signal using (i) a plurality of non-configurable parameters fixed in a design of said encoder, (ii) said configurable parameters and (iii) a plurality of dynamic parameters adjustable in real time by said encoder, wherein the test sequence of pictures is predetermined at startup to include a plurality of test picture frames that represents characteristics associated with the video signal;
   (C) generating a reconstructed sequence of pictures by decoding said bitstream;
   (D) generating a quality metric based on said reconstructed sequence of pictures compared with said test sequence of pictures; and
   (E) adjusting said respective trial values to modify said quality metric prior to encoding the video signal;
   wherein step (E) comprises the sub-step of:
   separating said configurable parameters into a plurality of uncorrelated subsets which are independently adjusted to modify said quality metric; and
   further comprising determining an encoding performance of said encoder comprising a weighted sum of a plurality of respective encoding performances for the plurality of said test sequences of said plurality of test picture frames having a plurality of respective video signal characteristics.

2. The method according to claim 1, further comprising the step of:
repeating (i) said generation of said bitstream, (ii) said generation of said reconstructed sequence of pictures, (iii) said generation of said quality metric and (iv) said adjusting of said respective trial values until a predetermined criteria is satisfied.

3. The method according to claim 1, wherein step (E) comprises the sub-step of:
adjusting said respective trial values by trial-based searching in a value space of said respective trial values.

4. The method according to claim 3, wherein each of said configurable parameters is adjusted individually.

5. The method according to claim 4, wherein said configurable parameters are adjusted sequentially, one of said configurable parameters at a time.

6. The method according to claim 3, wherein said trial-based searching comprises a Downhill Simplex Searching.

7. The method according to claim 1, wherein said quality metric comprises a peak signal to noise metric.

8. The method according to claim 1, wherein said quality metric comprises a Video Quality Metric in accordance with a National Telecommunication and Information Administration/Institute for Telecommunications Sciences.

9. A system comprising:
a parameter module configured to (i) store a plurality of configurable parameters in a non-transitory storage medium, each configurable parameter comprising a respective trial value, and (ii) adjust said respective trial values to modify a quality metric prior to encoding the video signal;
an encoder module configured to generate a bitstream by encoding a test sequence of pictures that are not embedded in a video signal using (i) a plurality of non-configurable parameters fixed in a design of said encoder module, (ii) said configurable parameters and (iii) a plurality of dynamic parameters adjustable in real time by said encoder module,
wherein the test sequence of pictures is predetermined at startup to include a plurality of test picture frames that represents characteristics associated with the video signal;
a decoder module configured to generate a reconstructed sequence of pictures by decoding said bitstream; and
an assessment module configured to generate said quality metric based on said reconstructed sequence of pictures compared with said test sequence of pictures prior to encoding the video signal;
wherein adjusting said respective trial values to modify said quality metric comprises the sub-step of:
separating said configurable parameters into a plurality of uncorrelated subsets which are independently adjusted to modify said quality metric; and
wherein an encoding performance of said encoder module comprises a weighted sum of a plurality of respective encoding performances for a plurality of said test sequences of said pictures having a plurality of respective video signal characteristics.

10. The system according to claim 9, further comprising an optimization module configured to identify a set of said respective trial values that modifies said quality metric.

11. The system according to claim 9, wherein said encoding performance characterizing a bitrate range comprises a linear combination of said encoding performance characterizing a plurality of individual bitrates inside said bitrate range.

12. The system according to claim 9, wherein said assessment module is further configured to maximize said encoding performance.

13. The system according to claim 10, wherein said configurable parameters comprises an adaptive quantization parameter.

14. The system according to claim 10, wherein said configurable parameters comprises a quantization scaling matrix.

15. The system according to claim 10, wherein said configurable parameters comprises a quantization rounding offset.

16. The system according to claim 10, wherein said configurable parameters comprises a Lagrangian multiplier optimal coding parameter.

17. The system according to claim 10, wherein said configurable parameters comprises a skip/copy mode control parameter.

18. A system comprising:
means for (i) storing a plurality of configurable parameters each comprising a respective trial value and (ii) adjusting said respective trial values to modify a quality metric prior to encoding the video signal;
means for encoding a test sequence of pictures that are not embedded in a video signal into a bitstream using (i) a plurality of non-configurable parameters fixed in a design of said means for encoding, (ii) said configurable parameters and (iii) a plurality of dynamic parameters adjustable in real time by said means for encoding, wherein the test sequence of pictures is predetermined at startup to include a plurality of test picture frames that represents characteristics associated with the video signal;
means for decoding said bitstream into a reconstructed sequence of pictures;
means for generating said quality metric based on said reconstructed sequence of pictures compared with said test sequence of pictures prior to encoding the video signal;
wherein adjusting said respective trial values to modify said quality metric comprises the sub-step of:
separating said configurable parameters into a plurality of uncorrelated subsets which are independently adjusted to modify said quality metric; and
means for determining an encoding performance of said encoder comprising a weighted sum of a plurality of respective encoding performances for the plurality of said test sequences of said plurality of test picture frames having a plurality of respective video signal characteristics.

19. The method of claim 1, wherein, said plural video signal characteristics in the weighted sum calculation includes at least bitrate and scene information.

* * * * *